Feb. 26, 1924.
A. WARMISHAM
PROJECTION LENS
Filed Aug. 30, 1922
1,484,853
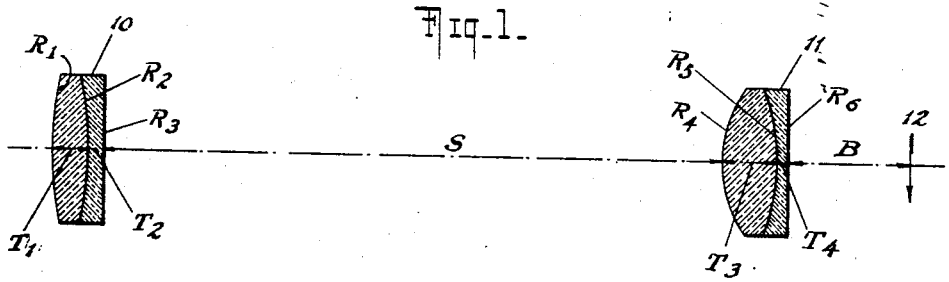
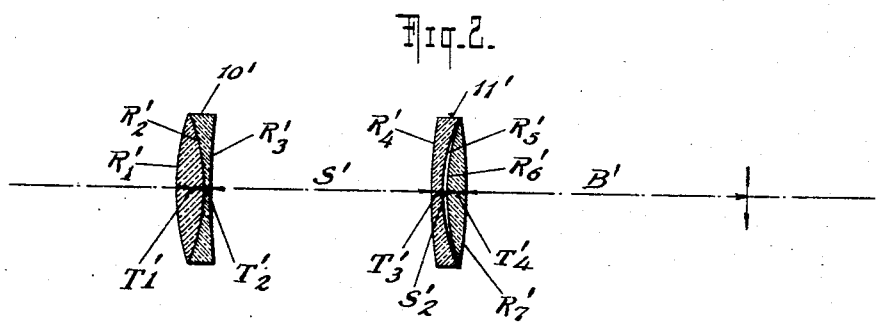
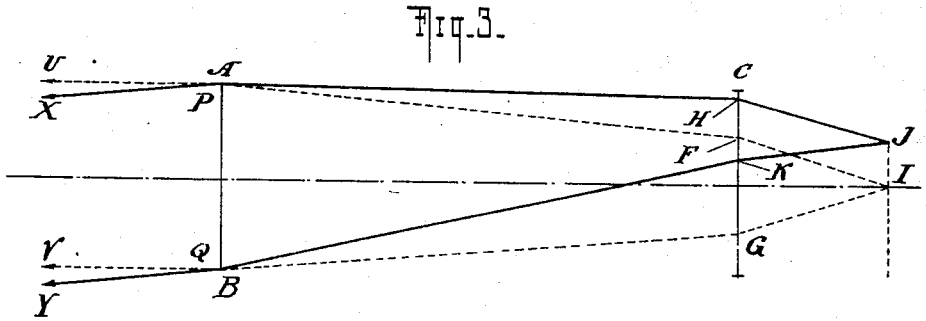
INVENTOR
Arthur Warmisham
BY
Arthur L. Kents
his ATTORNEY Patented Feb. 26, 1924.

1,484,853

UNITED STATES PATENT OFFICE.

ARTHUR WARMISHAM, OF LEICESTER, ENGLAND.

PROJECTION LENS.

Application filed August 30, 1922. Serial No. 585,160.

*To all whom it may concern:*

Be it known that I, ARTHUR WARMISHAM, a citizen of Great Britain, residing at Leicester, in the county of Leicestershire, England, have invented certain new and useful Improvements in Projection Lenses, fully described and represented in the following specification and the accompanying drawings, forming a part of the same.

This invention relates to projection lenses, adapted particularly for use in kinematograph machines, and has for its object to secure a brighter and more uniform illumination of the image upon the projection screen than has been obtained with the projection lenses heretofore used.

It has heretofore been customary to use as the projection lens of a kinematograph machine an ordinary portrait lens such as the well-known Petzval portrait lens. This lens was designed with a view to giving a clear definition over a wide field, so that it might be adequate for purposes of portrait photography. The lens consists of two convergent components which are so formed and positioned that the lens must be placed at a considerable distance from the object whose image is to be projected on the screen. As the result of this, and certain other factors hereinafter explained in detail, the lens is capable of receiving from the object, and transmitting, only a comparatively small conical light ray. Consequently the illumination of the image is comparatively weak unless an intensely bright light is used to illuminate the object, and in case such a light is used, a large proportion of the available light fails to pass through the lens to the screen and is, in consequence, wasted.

I have discovered that it is possible to make a lens resembling the Petzval lens, in that it consists of two separated convergent components, but in which the length of the air space between the two components and the focal lengths of the components are so modified that the lens may be placed as near the object as mechanical conditions permit and will transmit a relatively large proportion of the light emitted by the object.

In order to facilitate describing the exact nature of my invention, I will first define the terms which I shall use in describing a projection lens: In such a lens, consisting of two separated components, I term the component which is nearer to the object whose image is to be projected, that is, nearer the film in a kinematograph machine the "back component", and the component which is nearer the projected image on the screen, the "front component." I shall use the term "back focal length" to indicate the distance from the back surface of the back component of the lens to the point at which parallel rays striking the front component are focussed; or, in other words, I shall refer to the distance behind the back component at which the object should be placed to project an image upon an infinitely distant screen as the "back focal length." The term "equivalent focal length" I shall use in its ordinary significance. The term "exit pupil" I shall use as indicating the effective aperture of the front component. It will be noted, therefore, that the size and position of the exit pupil and the size and position of the image upon the screen determine the conical beam of light which is projected from the front of the lens. I shall use the term "entrance pupil" to indicate the image (real or virtual) of the exit pupil which is formed by the complete lens. The size of the entrance pupil, thus defined, and its distance from the object determine the size of the conical beam of light which enters the lens and is passed through it to the screen.

The specific object of the present invention is to provide a projection lens which will receive and transmit as large a beam of light as possible, by locating the entrance pupil of the lens as near as possible to the object without thereby reducing its size to such an extent that the reduction in the size of the pupil counterbalances the advantage gained by the position of the pupil. In other words, the object is to make the size and position of the entrance pupil such that it subtends as large an angle as possible at any point of the object.

I have found that the desired result may be accomplished in a lens consisting of two separated, convergent components by so forming and positioning the components that the back focal length of the lens is less than thirty-five one-hundredths (.35) of its equivalent focal length. By this means the entrance pupil, which, in an ordinary Petzval lens, is located a considerable distance in front of the object, is brought behind, and nearer to, the object, while, at the same time, the size of the entrance pupil is maintained sufficiently great so that the angle subtended by the entrance pupil at any point of the object is materially greater than in the case of a Petzval lens.

I have found that the above mentioned proportion between the back focal length and the equivalent focal length may be obtained by making the ratio of the distance between the two components to the equivalent focal length greater than it usually is in the Petzval portrait lens, and by forming the two components so that the focal length of the front component is substantially greater than the distance between the components while the focal length of the back component is materially less than this distance.

Another advantage of the new construction is that it is always possible to produce the requisite correction of the optical aberrations when both front and back components are cemented doublets, that is, using only four free surfaces. In the normal Petzval type, in order to produce the requisite correction of the optical aberrations, it is usually necessary to employ a cemented doublet as the front component, and an uncemented doublet as the back component, that is, using six free surfaces in all. Since there is a loss of about five per cent of the incident light on a perfectly clean free surface, this enables me to produce an increase of ten per cent in the illumination of the screen in addition to the increases produced by the improved angle subtended by the entrance pupil.

A specific lens embodying my invention will be described in detail in connection with the accompanying drawings, in which:

Fig. 1 is a diagrammatic side view of a lens embodying the invention;

Fig. 2 is a similar view of the ordinary Petzval lens, for purposes of comparison; and Fig. 3 is a diagram illustrating the method of computing the size of the beam of light received by either of the lenses.

In Fig. 1, 10 represents the front component of the lens, 11 the back component, and 12 the object whose image is to be a projected. The form and position of the components are defined in the following numerical table:

| | | | | Type No. |
|---|---|---|---|---|
| $R_1$+10.700 | $T_1$= .698 | $n_D$ | 1.509/−64.3 | 646 |
| $R_2$− 8.940 | | | | |
| $R_3$−39.60 | $T_2$= .348 | $n_D$ | 1.651/−33.5 | 5093 |
| | S =−13.10 | air | | |
| $R_4$+ 2.938 | $T_3$= 1.128 | $n_D$ | 1.509/−64.3 | 646 |
| $R_5$− 5.030 | | | | |
| $R_6$ ∞ | $T_4$= .206 | $n_D$ | 1.651/−33.5 | 5093 |

In this table, the characters $R_1$, $R_2$, etc., denote the radii of the surfaces of the parts of the two components, to which surfaces these symbols are applied in Fig. 1, and a + sign indicates that the surface receives light on its concave side, while a − sign indicates that a surface receives light on its convex side. The symbols $n_D$ and $V$ are used in the conventional sense to indicate the character of the glass from which the parts of the components are made. In addition, the type of each part is indicated by a type number corresponding to the system used in Chance's Optical Glass Catalogue. The symbols $T_1$, $T_2$, etc., indicate the thicknesses of the various parts to which these symbols are applied in Fig. 1. The distance between the two components is indicated by S. All the dimensions are given in inches.

The focal length of the front component 10 of the lens defined in Fig. 1 and the above table is 20.86 inches, which, it will be noted, is greater than the distance of 13.1 inches which separates the two components. The focal length of the back component 11 is 6.73 inches or approximately one-half of the distance between the components. The equivalent focal length of the entire lens is 10 inches, while its back focal length, indicated by B in Fig. 1, is 2.508 inches, or 25.08% of the equivalent focal length.

For the purpose of comparison, I quote the data for a Petzval portrait lens of the usual type from Von Rohr's "Theorie u. Geschichte der Photographischen Objectivs," p. 250. This data is given in the following table, taken in connection with Fig. 2 of the drawings. The same symbols are used with the same significance as in the table previously given, except that a prime (′) is added to each of the symbols which appears in Fig. 2 of the drawings:

| | | | |
|---|---|---|---|
| $R'_1$+ 5.29 | $T'_1$ .58 | $n_D$ | 1.517 |
| $R'_2$− 4.14 | $T'_2$ .15 | $n_D$ | 1.575 |
| $R'_3$+43.62 | | | |
| $R'_4$+10.48 | $S'_1$ 4.66 | air | |
| $R'_5$+ 3.68 | $T'_3$ .22 | $n_D$ | 1.575 |
| $R'_6$+ 4.55 | $S'_2$ .07 | air | |
| $R'_7$−14.95 | $T'_4$ .36 | $n_D$ | 1.517 |

The focal length of the front component 10′ of the Petzval lens defined in Fig. 2 and the above table, is 13.96 inches, while the focal length of the back component 11′ is 20.91 inches, which is greater than the separation between the two components. The equivalent focal length of the complete Petzval lens is 10 inches, while its back focal length, indicated at B′ in Fig. 2 is 5.857 inches, or 58.57% of the equivalent focal length.

In order to make plain the advantage obtained by the use of a new projection lens, I will indicate the method by which the amount of light transmitted by the new lens and the Petzval lens may be computed and will give the result of such computation.

The angle subtended by the entrance pupil at a point of the object cannot be accurately expressed algebraically on the basis of the Gaussian equations owing to the enormous residual spherical aberrations to which the entrance pupil is subject, but recourse must be had to trigonometrical computation.

In Fig. 3 the lines AB, CD are supposed to represent the front and back surfaces, respectively, of a projection lens. IJ is the object, and the projected image is supposed to be infinitely distant on the left of the drawing. PQ is the free aperture of the front component, i. e. the exit pupil. The axial point of the image is formed by the pencil of light bounded by the rays I F P U, L G Q V. From a marginal point J of the object the lens transmits a pencil of light bounded by the rays J H P X, J K Q Y, the emergent parallel pencil PX, QY, being taken at an angle of 5° to the axis of the lens, corresponding approximately to the angular field used by a 5 inch lens on the usual kinematograph object.

Trigonometrical computations of the two lenses, first, the new lens of Fig. 1, and, second, the normal Petzval portrait lens of Fig. 2. have been made assuming the same free aperture in each case, viz 3.20 inches (=F/3.1), or, in other words, assuming that both have the same size of exit pupil.

These calculations determine that:

(1) The entrance pupils in the two cases are located: for new construction 7.6 inches behind the object; for normal Petzval portrait lens, 13.4 inches in front of the object.

(2) The angle H J K subtended by the entrance pupil at the marginal point J of the object is:—for new construction 19° 49', for normal Petzval portrait lens, 18° 13' to the nearest minute of arc.

That is, in the meridian plane (to which the computations have been confined for the sake of brevity) the angle subtended by the entrance pupil at a marginal point of the object is increased by about 9% in the new lens compared with the normal Petzval portrait lens, which has an exit pupil of the same size.

This ratio between the plane angles subtended by the entrance pupils in the two cases does not, however, give an adequate idea of the advantage obtained by the invention, since the degree of illumination is determined by the ratio between the solid angles subtended by the entrance pupils, and the ratio between the solid angles is, of course, much greater than that between the angles of a given plane. It has been determined by actual measurement that the new lens increases the illumination at the centre of the screen by 52% over the illumination produced by a projection lens of the normal Petzval type. This increased efficiency is due to three causes:—

I. The improved angle subtended by the entrance pupil.

II. A slight increase in the size of the exit pupil.

III. A saving of 10% of the transmitted light by employing a cemented back component in the new construction.

To secure the greatest advantages of the invention, it is desirable to make the back focal length of the lens as small a fraction of the equivalent focal length as practicable. Thus, in the example given, the back focal length is substantially one-fourth of the equivalent focal length. As the lens has an equivalent focal length of 10 inches, this makes the back focal length about 2½ inches, which allows ample space for securing the lens in a kinematograph machine without interference with any parts of the machine. In order to avoid such interference, however, it is in all cases desirable that the back focal length should be as great as one inch. Consequently, when the invention is embodied in a lens of comparatively short equivalent focal length, as, for example, of an equivalent focal length less than four inches, the back focal length should be made a somewhat larger proportion of the equivalent focal length than in the example given, in order to avoid interference of the lens with the parts of the machine. I have found, however, that increased illumination, which is the object of the invention, may be obtained when the back focal length is as great as 35% of the equivalent focal length. It is apparent that when this ratio is used, the invention may be incorporated in a lens having a three-inch equivalent focal length without making the back focal length less than one inch.

What I claim is:

1. A projection lens of the Petzval type, comprising two convergent components so formed and positioned that the ratio of the back focal length of the lens to the equivalent focal length thereof is less than 35%.

2. A projection lens of the Petzval type, comprising two convergent components so formed and positioned that the ratio of the back focal length of the lens to the equivalent focal length thereof is less than 35%, while the numerical value of the back focal length is greater than one inch.

3. A projection lens of the Petzval type, comprising two convergent components, both of which are cemented doublets and so formed and positioned that the ratio of the back focal length of the lens to the equivalent focal length thereof is less than 35%, while the numerical value of the back focal length is greater than 1 inch.

4. A projection lens of the Petzval type, comprising two separated convergent components, so formed and positioned that the focal length of the back component is materially less than either the focal length of the front component or the separation between the two components.

5. A projection lens of the Petzval type, comprising two separated convergent components, both of which are cemented doublets, and so formed and positioned that the focal length of the back component is materially less than either the focal length of the front component or the separation between the two components.

In testimony whereof I have hereunto set my hand in the presence of two subscribing witnesses.

ARTHUR WARMISHAM.

Witnesses:
R. D. BENNETT,
C. A. COPPACK.